United States Patent
Hirai

(10) Patent No.: US 7,250,736 B2
(45) Date of Patent: Jul. 31, 2007

(54) OPENING AND CLOSING MEMBER CONTROL SYSTEM

(75) Inventor: Kazuyuki Hirai, Kasugai (JP)

(73) Assignee: ASMO Co., Ltd., Shizuoka-pref. (JP)

(*) Notice: Subject to any disclaimer, the term of this patent is extended or adjusted under 35 U.S.C. 154(b) by 0 days.

(21) Appl. No.: 11/390,103

(22) Filed: Mar. 28, 2006

(65) Prior Publication Data

US 2006/0220604 A1 Oct. 5, 2006

(30) Foreign Application Priority Data

Mar. 30, 2005 (JP) ............................. 2005-097235

(51) Int. Cl.
*E05F 15/16* (2006.01)
(52) U.S. Cl. ...................... 318/266; 318/286; 318/434; 318/456
(58) Field of Classification Search ........ 318/264–266, 318/283, 286, 434, 456, 466–469; 49/26
See application file for complete search history.

(56) References Cited

U.S. PATENT DOCUMENTS

| | | | |
|---|---|---|---|
| 4,468,596 A | | 8/1984 | Kinzl et al. |
| 4,471,274 A | * | 9/1984 | Ross et al. .................. 318/282 |
| 4,585,981 A | * | 4/1986 | Zintler ........................ 318/615 |
| 4,870,333 A | | 9/1989 | Itoh et al. |
| 5,278,480 A | * | 1/1994 | Murray ........................ 318/626 |
| 5,436,539 A | | 7/1995 | Wrenbeck et al. |
| 5,521,474 A | | 5/1996 | Hahn |
| 5,530,329 A | | 6/1996 | Shigematsu et al. |
| 5,539,290 A | | 7/1996 | Lu et al. |
| 5,982,124 A | * | 11/1999 | Wang .......................... 318/466 |
| 5,994,858 A | | 11/1999 | Miura |
| 6,100,658 A | | 8/2000 | Kume et al. |
| 6,150,784 A | | 11/2000 | Nagaoka |
| 6,208,102 B1 | * | 3/2001 | Kikuchi et al. ............. 318/466 |
| 6,274,947 B1 | * | 8/2001 | Terashima .................. 307/10.1 |
| 6,298,295 B1 | * | 10/2001 | Tyckowski .................... 701/49 |
| 6,555,982 B2 | * | 4/2003 | Tyckowski .................. 318/465 |
| 6,753,669 B2 | * | 6/2004 | Spreng et al. .............. 318/469 |
| 6,943,515 B2 | * | 9/2005 | Kidokoro .................... 318/466 |
| 7,038,413 B2 | * | 5/2006 | Onozawa et al. ........... 318/443 |

FOREIGN PATENT DOCUMENTS

| | | |
|---|---|---|
| JP | A-H7-158338 | 6/1995 |
| JP | A-H8-260810 | 8/1996 |
| JP | A-2001-248358 | 9/2001 |
| JP | A-2002-295128 | 9/2002 |

* cited by examiner

*Primary Examiner*—Bentsu Ro
(74) *Attorney, Agent, or Firm*—Posz Law Group, PLC

(57) ABSTRACT

A motor drives a window glass of a door of a vehicle in an opening direction and a closing direction. A rotation sensing device outputs a pulse signal in response to rotation of the motor. A controller senses pinching of an object by the window glass based on the rotational speed signal. Specifically, the controller computes a rate of change in the rotational speed, i.e., a rotational speed difference based on the rotational speed signal. The controller senses start of the pinching based on the rotational speed difference. When an amount of change in the rotational speed since the time of sensing the start of the pinching exceeds a pinching determining threshold value, the controller confirm the pinching of the object.

11 Claims, 3 Drawing Sheets

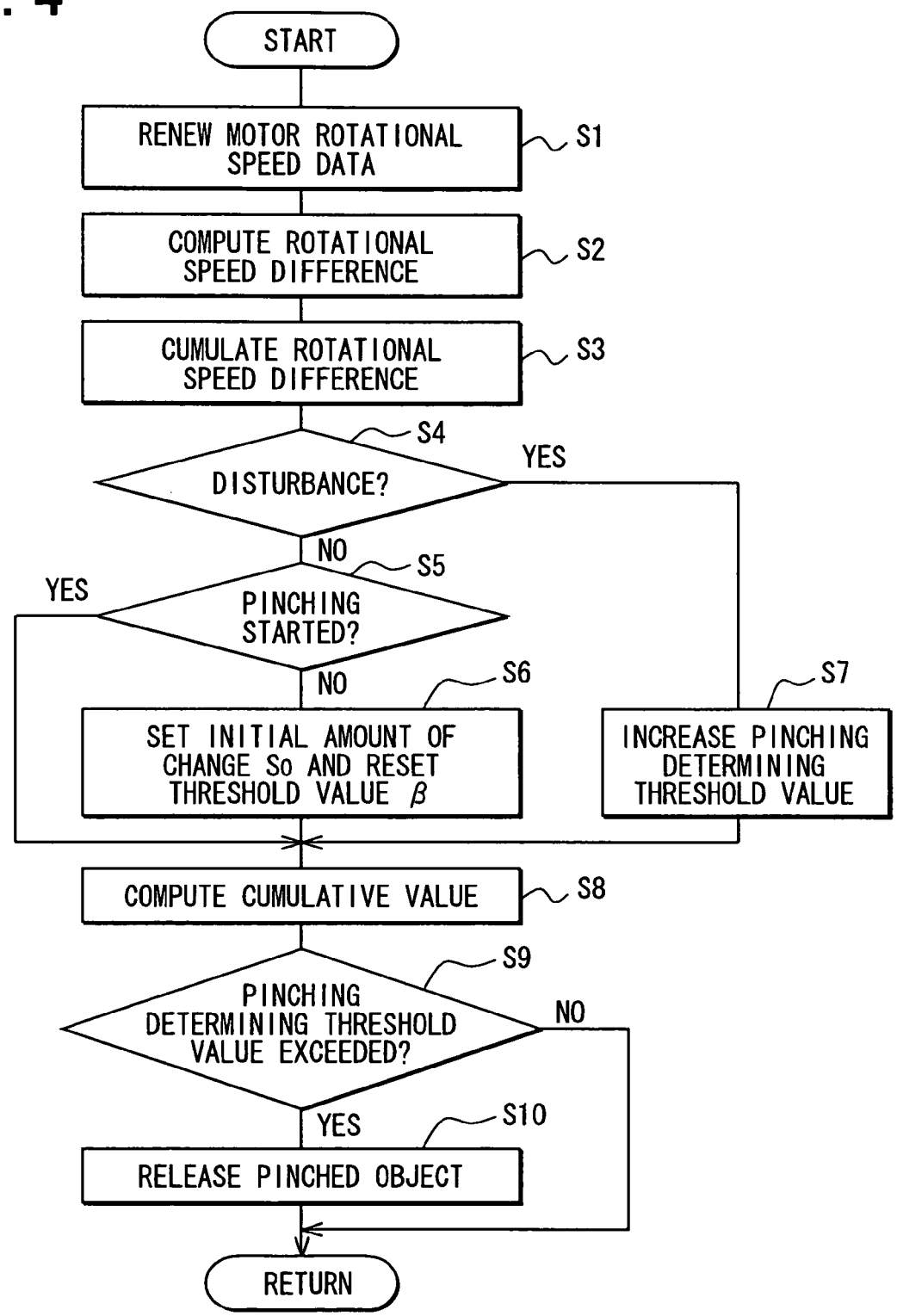

OPENING AND CLOSING MEMBER CONTROL SYSTEM

CROSS REFERENCE TO RELATED APPLICATION

This application is based on and incorporates herein by reference Japanese Patent Application No. 2005-97235 filed on Mar. 30, 2005. This application is also related to U.S. application Ser. No. 11/390,418, entitled "OPENING AND CLOSING MEMBER CONTROL SYSTEM," filed on Mar. 28, 2006.

BACKGROUND OF THE INVENTION

1. Field of the Invention

The present invention relates to an opening and closing member control system for controlling movement of an opening and closing member.

2. Description of Related Art

In a case where a power window system of a vehicle is designed to detect pinching of a hard object by a window glass, when a soft object is pinched by the window glass, the pinching of the soft object may not be detected, or the detection of the pinching of the soft object may be delayed. In contrast, in a case where the power window system is designed to detect pinching of the soft object, a threshold value for detecting the pinching is reduced. This will likely cause erroneous detection of the pinching.

In order to address the above disadvantage, for example, Japanese Unexamined Patent Publication No. H07-158338 discloses use of two threshold values, i.e., a threshold value for the hard objects and a threshold value for the soft objects. In Japanese Unexamined Patent Publication No. H07-158338, a change rate of a rotational period is computed based on a pulse signal, which indicates rotation of a motor that drives the window glass. When the change rate of the rotational period exceeds the first threshold value (the threshold value that corresponds to the hard objects), it is immediately determined that the object is pinched by the window glass. When the change rate of the rotational period is decreased below the first threshold value but above a second threshold value (the threshold value that corresponds to the soft objects) through a period of a predetermined number of pulses, it is determined that the object is pinched by the window glass. In this way, the technique recited in Japanese Unexamined Patent Publication No. H07-158338 allows detection of both the hard objects and the soft objects.

However, in the above described technique, when an object of an intermediate hardness between the soft objects and the hard objects is pinched by the window glass, the pinching of the object cannot be detected until the second threshold value, which corresponds to the soft objects, is exceeded continuously a predetermined number of times. Thus, at the time of detecting the pinching of the object, the pinching load is disadvantageously increased, so that detection of the pinched object at a relatively low pinching load is not possible.

SUMMARY OF THE INVENTION

The present invention addresses the above disadvantages. Thus, it is an objective of the present invention to provide an opening and closing member control system, which enables improved detection of pinching of an object by an opening and closing member at a relatively low pinching load regardless of a hardness of the pinched object.

To achieve the objective of the present invention, there is provided an opening and closing member control system, which includes a drive means, a moving speed sensing means and a pinching sensing means. The drive means is for driving an opening and closing member in an opening direction and a closing direction, respectively, of the opening and closing member. The moving speed sensing means is for outputting a speed measurement signal, which indicates a moving speed that corresponds to movement of the opening and closing member driven by the drive means. The pinching sensing means is for sensing pinching of an object by the opening and closing member based on the speed measurement signal. The pinching sensing means computes an amount of change in the moving speed per unit interval based on the speed measurement signal. The pinching sensing means senses start of the pinching of the object by the opening and closing member based on the amount of change in the moving speed per unit interval. The pinching sensing means computes a total amount of change in the moving speed since time of sensing the start of the pinching of the object by the opening and closing member. The pinching sensing means confirms the pinching of the object by the opening and closing member when the total amount of change in the moving speed exceeds a pinching determining threshold value.

The pinching sensing means may sense the start of the pinching of the object when the amount of change in the moving speed per unit interval exceeds a change determining threshold value.

Furthermore, an amount of change in the moving speed per unit moving distance may be computed by the pinching sensing means as the amount of change in the moving speed per unit interval based on the speed measurement signal. A cumulative value of every computed amount of change in the moving speed per unit moving distance since the time of sensing the start of the pinching of the object by the opening and closing member may be computed by the pinching sensing means as the total amount of change in the moving speed since the time of sensing the start of the pinching of the object by the opening and closing member. Alternatively, a pre-start cumulative value of every computed amount of change in the moving speed per unit moving distance from predetermined timing to the time of sensing the start of the pinching of the object by the opening and closing member may be subtracted by the pinching sensing means from a current cumulative value of every computed amount of change in the moving speed per unit moving distance from the predetermined timing to current time to obtain a difference between the pre-start cumulative value and the current cumulative value as the total amount of change in the moving speed.

The pinching sensing means may increase the pinching determining threshold value on a negative side when the amount of change in the moving speed per unit interval exceeds a disturbance determining threshold value on a positive side.

The pinching sensing means may reset the pinching determining threshold value, which has been increased on the negative side, to an initial value when the amount of change in the moving speed per unit interval does not exceeds the change determining threshold value.

The drive means may include a motor. The moving speed sensing means may output a rotational speed signal of the motor, which indicates a rotational speed of the motor, as the speed measurement signal. The pinching sensing means may use an amount of change in the rotational speed of the motor per unit interval, which is computed based on the rotational speed signal of the motor, as the amount of change in the moving speed per unit interval. The pinching sensing means may compute the rotational speed of the motor based on a predetermined number of consecutive pulse signals, each of which is synchronized with rotation of the motor and is outputted per unit rotational angle of the motor from the moving speed sensing means as the rotational speed signal. The pinching sensing means may compute the amount of change in the moving speed per unit interval based on an average rotational speed that is obtained by averaging a predetermined number of consecutive computed rotational speeds, each of which is computed per unit rotational angle of the motor.

BRIEF DESCRIPTION OF THE DRAWINGS

The invention, together with additional objectives, features and advantages thereof, will be best understood from the following description, the appended claims and the accompanying drawings in which:

FIG. 4 is a flowchart for describing a pinching determination process of the embodiment.

DETAILED DESCRIPTION OF THE INVENTION

Figure 1:
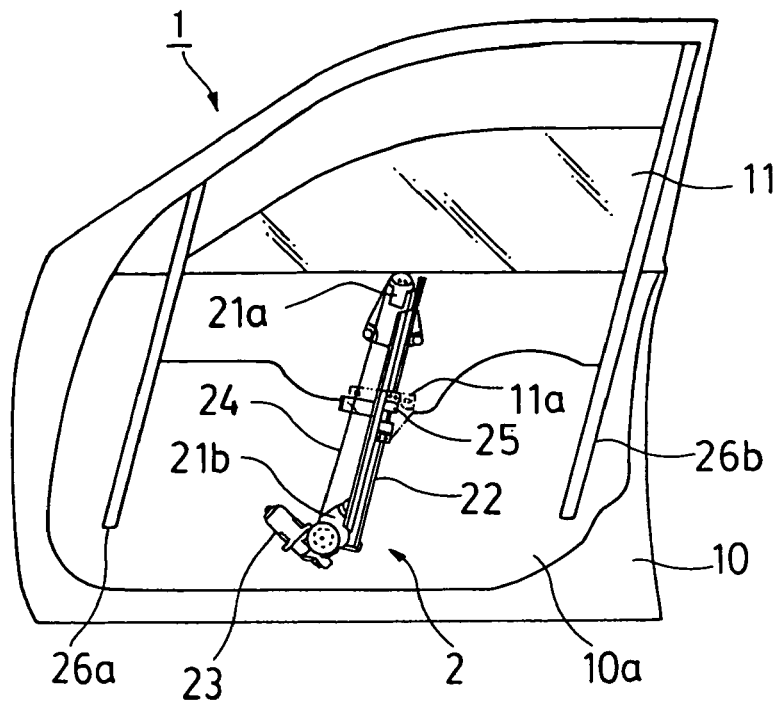
FIG. 1 is a diagram for describing a power window system according to an embodiment of the present invention.
Figure 2:
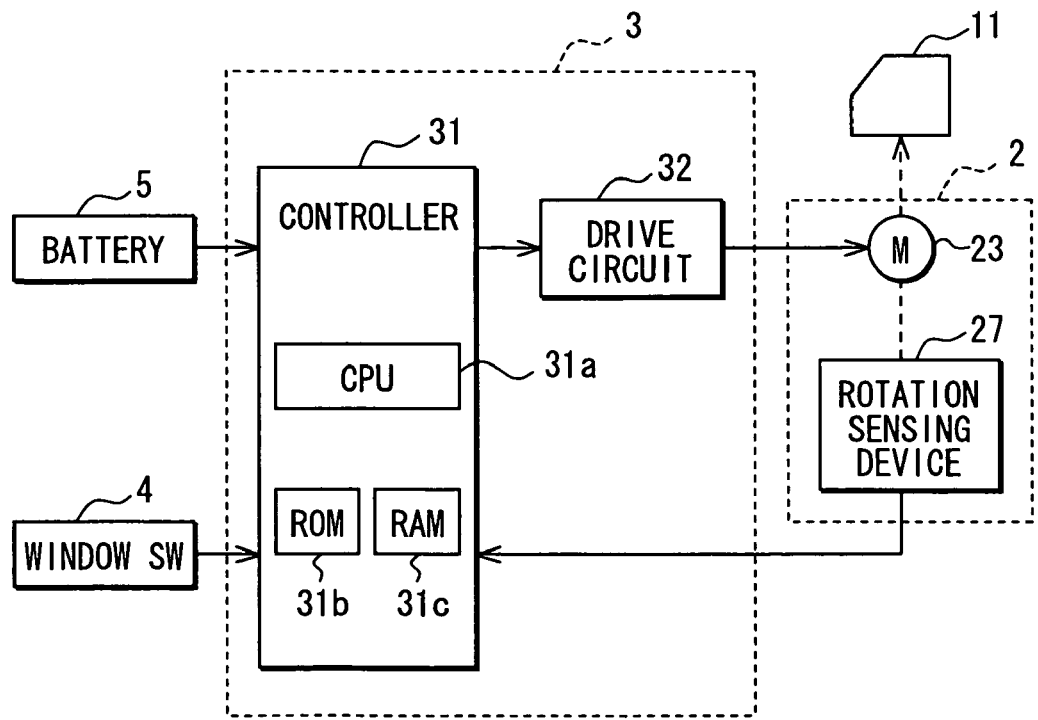
FIG. 2 is a diagram showing an electrical construction of the power window system.

An embodiment of the present invention will be described with reference to the accompanying drawings. It should be noted that the following structure, procedure or the like are not intended to limit a scope of the present invention and may be modified in various ways without departing the scope and spirit of the present invention.

A control apparatus of a power window system according to the present embodiment will be described. In the power window system 1 of the present embodiment, a window glass (a window panel) 11, which serves as an opening and closing member arranged in a vehicle door 10, is raised and lowered by rotation of a motor 23 to close and open a window opening of the vehicle door 10. The power window system 1 includes a drive arrangement (a drive means) 2, a control arrangement (a control means) 3 and an operational switch (a window switch) 4. The drive arrangement 2 is for driving the window glass 11 in an opening direction and a closing direction (a downward direction and an upward direction). The control arrangement 3 is for controlling an operation of the drive arrangement 2. The operational switch 4 is for inputting an operational command of an occupant (a user).

The drive arrangement 2 includes upper and lower brackets 21a, 21b, a guide rail 22, a motor 23, an endless tape 24, a slider 25 and two guide frames 26a, 26b. The upper and lower brackets 21a, 21b are provided to an inner panel 10a of the door 10. The guide rail 22 is arranged to connect between the upper bracket 21a and the lower bracket 21b. The motor 23 is installed to the lower bracket 21b. The endless tape 24 is placed around the upper bracket 21a and a sprocket, which is connected to an output shaft of the motor 23, in such a manner that the endless tape 24 is rotatable. The slider 25 is slidably guided by the guide rail 22, which is installed to the tape 24. The guide frames 26a, 26b guide the window glass 11 in an opening/closing (downward/upward) direction of the window glass 11. A carrier plate 11a, which supports a lower end of the window glass 11, is installed to the slider 25.

The motor 23 of the present embodiment is rotatable in both a normal direction and a reverse direction upon receiving electric power from the control arrangement 3. In the drive arrangement 2 of the present embodiment, when the motor 23 is rotated in the normal or reverse direction, a rotational force is transmitted to the tape 24 through the sprocket to rotate the tape 24. When the tape 24 is rotated, the slider 25 is guided in the upward or downward direction along the guide rail 22. When the slider 25 is guided in the upward or downward direction along the guide rail 22, the slider 25 moves the window glass 11 in the upward or downward direction through the carrier plate 11a along the guide frames 26a, 26b. As described above, the drive arrangement 2 lowers or raises the window glass 11 through the operation of the motor 23 to open or close the window opening of the door 10.

A rotation sensing device 27, which serves as a moving speed sensing means, is provided integrally with the motor 23. The rotation sensing device 27 outputs a pulse signal (a speed measurement signal, a rotational speed signal), which is synchronized with the rotation of the motor 23, to the control arrangement 3. The rotation sensing device 27 includes a plurality of Hall elements, which sense a magnetic change of a magnet, which rotates integrally with the output shaft of the motor 23. With the above construction, the rotation sensing device 27 outputs the pulse signal that is synchronized with rotation of the motor 23. That is, the rotation sensing device 27 outputs the pulse signal per unit interval (e.g., per unit moving distance, such as per unit displacement amount of the window glass 11 or per unit rotational angle of the motor 23). More specifically, the rotation sensing device 27 outputs the pulse signal at every predetermined displacement amount of the window glass 11 or at every predetermined rotational angle of the motor 23. In this way, the rotation sensing device 27 can output the signal, which corresponds to the displacement, i.e., the movement of the window glass 11 that is generally proportional to the rotation of the motor 23.

In the present embodiment, the Hall elements are used in the rotation sensing device 27. However, the rotation sensing device 27 is not limited to the one having the Hall elements. In other words, in place of the Hall elements, the rotation sensing device 27 may include any other appropriate arrangement, such as an encoder, as long as the other appropriate arrangement can effectively sense the rotational speed of the motor 23. Furthermore, in the present embodiment, the rotation sensing device 27 is provided integrally with the motor 23 to sense the rotational speed of the output shaft of the motor 23, which corresponds to the movement of the window glass 11. However, the present invention is not limited to this. For example, the moving speed of the window glass 11 may be directly sensed by any other known arrangement or device.

The control arrangement 3 of the present embodiment includes a controller 31 and a drive circuit 32. The controller 31 and the drive circuit 32 receive its electric power from a battery 5 installed in the vehicle.

The controller 31 of the present embodiment includes a microcomputer, which has a CPU 31*a*, memories, such as a ROM (e.g., an EPROM) 31*b*, a RAM 31*c*, an input circuit and an output circuit (not shown). The CPU 31*a* is interconnected with the memories 31*b*, 31*c*, the input circuit and the output circuit through a bus line (not shown). The controller 31 is not limited to the above one. Alternatively, for example, the controller 31 may include a DSP or a gate array.

Normally, the controller 31 rotates the motor 23 in the normal or reverse direction through the drive circuit 32 based on an operational signal transmitted from the operational switch 4, so that the window glass 11 is moved in the upward or downward. Furthermore, the controller 31 receives the pulse signal from the rotation sensing device 27. Based on this pulse signal, the controller 31 can sense pinching, i.e., clamping of an object between an upper end portion of the window glass 11 and the window frame of the door 10, which defines the window opening therein. When the pinching of the object is sensed, the controller 31 rotates the motor 23 in the opening direction for lowering the window glass 11 through the drive circuit 32, so that the window glass 11 is lowered. Therefore, the controller 31 of the present embodiment serves as a pinching sensing means.

The drive circuit 32 of the present embodiment includes a plurality of FETs to change a polarity of the power supply to the motor 23 based on an input signal from the controller 31. Specifically, when the drive circuit 32 receives a normal rotation command signal from the controller 31, the drive circuit 32 supplies the electric power to the motor 23 in a manner that rotates the motor 23 in the normal direction. In contrast, when the drive circuit 32 receives a reverse rotation command signal from the controller 31, the drive circuit 32 supplies the electric power to the motor 23 in a manner that rotates the motor 23 in the reverse direction. Alternative to the FETs, the drive circuit 32 may include a relay circuit to change the polarity. Furthermore, the drive circuit 32 may be incorporated into the controller 31, if desired.

The controller 31 senses a respective leading edge and a respective trailing edge (the leading edge and the trailing edge being collectively referred to as pulse edges) of the respective pulse signal supplied to the controller 31. Based on an interval (a period) between the corresponding pulse edges, the controller 31 computes a rotational speed (a rotational period) of the motor 23. Also, based on a phase difference of the respective pulse signal, the controller 31 senses the rotational direction of the motor 23. That is, the controller 31 indirectly computes the moving speed of the window glass 11 based on the rotational speed (the rotational period) of the motor 23 and determines the moving direction of the window glass 11 based on the rotational direction of the motor 23. Furthermore, the controller 31 counts the pulse edges. A pulse count value, i.e., a pulse count number (or simply referred to as a pulse count) is increased or decreased depending on the downward or upward movement (the opening or closing movement) of the window glass 11. The controller 31 specifies the vertical position (an opening/closing position) of the window glass 11 based on the pulse count value.

The operational switch 4 of the present embodiment may be a rocker switch, which is operable in two levels and includes a window down switch part (a window down switch circuit), a window up switch part (a window up switch circuit) and an auto switch part (an auto switch circuit). When the occupant operates the operational switch 4, a command signal for lowering or raising the window glass 11 is outputted from the operational switch 4 to the controller 31.

Specifically, when the operational switch 4 is operated to a first level on one end side, the window down switch part is turned on, so that a normal lowering command signal for performing a normal lowering operation of the window glass 11 (lowering the window glass 11 throughout a period of holding the operational switch 4 to the first level on the one end side) is outputted from the operational switch 4 to the controller 31. Furthermore, when the operational switch 4 is operated to a first level on the other end side, the window up switch part is turned on, so that a normal raising command signal for performing a normal raising operation of the window glass 11 (raising the window glass 11 throughout a period of holding the operational switch 4 to the first level on the other end side) is outputted from the operational switch 4 to the controller 31.

Furthermore, when the operational switch 4 is operated to a second level beyond the first level on the one end side, the window down switch part and the auto switch part are both turned on, so that an automatically lowering command signal for performing an automatic lowering operation of the window glass 11 (lowering the window glass 11 all the way to a fully lowered position even if the operational switch 4 is released from a hand of the occupant) is outputted from the operational switch 4 to the controller 31. Furthermore, when the operational switch 4 is operated to a second level beyond the first level on the other end side, the window up switch part and the auto switch part are both turned on, so that an automatically raising command signal for performing an automatic raising operation of the window glass 11 (raising the window glass 11 all the way to a fully raised position even if the operational switch 4 is released from the hand of the occupant) is outputted from the operational switch 4 to the controller 31.

The controller 31 drives the motor 23 through the drive circuit 32 to perform the normal lowering operation of the window glass 11 throughout the period of receiving the normal lowering command signal (throughout the period of holding the operational switch 4 to the first level on the one end side). Also, the controller 31 drives the motor 23 through the drive circuit 32 to perform the normal raising operation of the window glass 11 throughout the period of receiving the normal raising command signal (throughout the period of holding the operational switch 4 to the first level on the other end side).

Furthermore, when the controller 31 receives the automatically lowering command signal from the operational switch 4, the controller 31 drives the motor 23 through the drive circuit 32, so that the automatic lowering operation is performed to lower the window glass 11 all the way to the fully lowered position (the open position). Furthermore, when the controller 31 receives the automatically raising command signal from the operational switch 4, the controller 31 drives the motor 23 through the drive circuit 32, so that the automatic raising operation is performed to raise the window glass 11 all the way to the fully raised position (the closed position).

At the time of performing the raising operation (the normal raising operation or the automatic raising operation) of the window glass 11, the controller 31 monitors occurrence of the pinching by the window glass 11. When the pinching by the window glass 11 occurs, the moving speed of the window glass 11 and the rotational speed of the motor 23 are decreased, thereby resulting in an increase in the rotational period. Thus, the controller 31 of the present embodiment always monitors the change in the rotational speed of the motor 23 during its operation.

The controller 31 of the present embodiment first detects start, i.e., initiation of the pinching based the change in the rotational speed. Then, when a total amount of change in the rotational speed since the time of sensing the start of the pinching reaches a predetermined amount, the controller 31 determines, i.e., confirms that the pinching has occurred.

When it is determined that the pinching has occurred, the controller 31 reverses the rotation of the motor 23 to release the object, which is pinched by the window glass 11, so that the window glass 11 is lowered by a predetermined amount. Alternatively, when it is determined that the pinching has occurred, the controller 31 may stop the motor 23 to stop the further raising movement of the window glass 11 and thereby to allow release of the object pinched by the window glass 11.

Figure 3A:
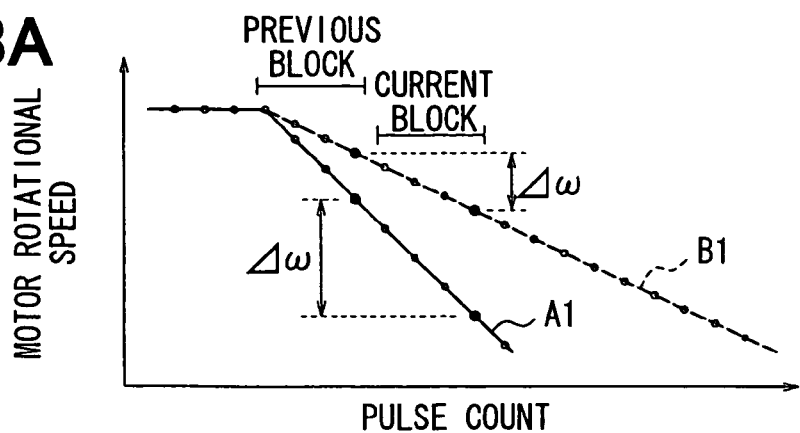
FIG. 3A is a diagram showing a relationship between a pulse count and a rotational speed of a motor of the power window system.
Figure 3B:
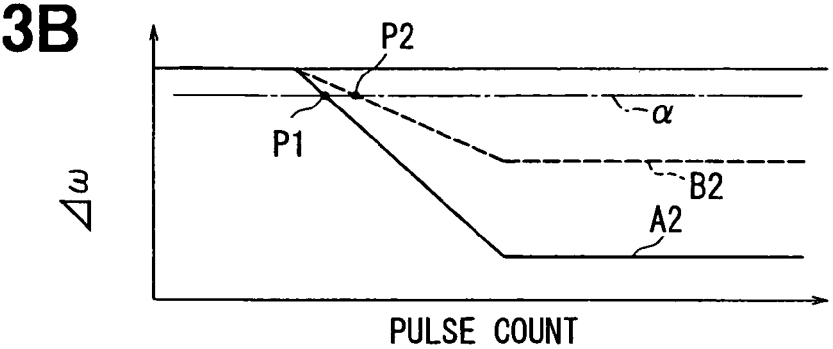
FIG. 3B is a diagram showing a relationship between a pulse count and a rotational speed difference of the motor of the power window system.
Figure 3C:
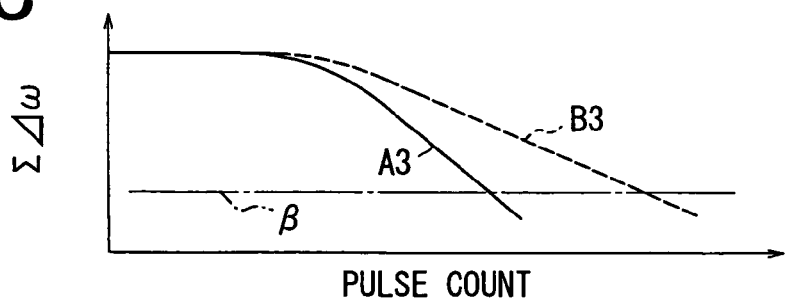
FIG. 3C is a diagram showing a relationship between a pulse count and a sum of rotational speed differences.

Next, the pinching determination operation of the power window system 1 of the present embodiment will be described with reference to FIGS. 3A to 3C. In the power window system 1 of the present embodiment, the rotational speed $\omega$ of the motor 23 is computed based on the pulse signal received from the rotation sensing device 27 and is stored in the memory (e.g., in the RAM 31$c$ during the normal operation and in the EPROM 31$b$ upon turning off of an ignition key of the vehicle for backup purpose). FIG. 3A shows a change in the thus computed rotational speed $\omega$. In FIG. 3A, the axis of ordinates corresponds to the motor rotational speed, and the axis of the abscissas corresponds to the pulse count number. FIG. 3A shows a case where the rotational speed $\omega$ of the motor 23 is decelerated by the pinching in the middle of the rotation of the motor 23. In FIG. 3A, a data line A1 indicates a state where a hard object is pinched by the window glass 11, and thereby the rotational speed $\omega$ is decelerated at a relatively high deceleration rate. Furthermore, a data line B1 indicates a state where a soft object is pinched by the window glass 11, and thereby the rotational speed $\omega$ is decelerated at a relatively low deceleration rate. In FIGS. 3B and 3C, data lines A2, A3 correspond to the state where the hard object is pinched by the window glass 11, and data lines B2, B3 correspond to the state where the soft object is pinched by the window glass 11.

In the power window system 1 of the present embodiment, based on the above data of the rotational speed $\omega$, there is computed a rotational speed difference $\Delta\omega$, which is a difference between the current rotational speed $\omega$ and the previous rotational speed $\omega$, which was previously measured several pulse edges before the measurement of the current rotational speed $\omega$. The rotational speed difference $\Delta\omega$ corresponds to a rate of change in the rotational speed (the moving speed), i.e., an amount of change in the rotational speed (the moving speed) per unit interval. FIG. 3B shows a change in the rotational speed difference $\Delta\omega$. With respect to FIG. 3A, it should be noted that an absolute value of the rotational speed difference $\Delta\omega$ of the data line A1 is larger than that of the data line B1.

Here, it is first determined whether the thus computed rotational speed difference $\Delta\omega$ exceeds a change determining threshold value $\alpha$ (FIG. 3B). When the rotational speed difference $\Delta\omega$ exceeds the change determining threshold value $\alpha$, it is temporarily determined that the pinching has started. In FIG. 3B, the start of the pinching (i,e., the possible pinching incidence) is detected at a point P1 and a point P2. However, at this time, the pinching is not affirmed, so that the rotation of the motor 23 is continued, and thereby the upward movement of the window glass 11 is continued.

The change determining threshold value $\alpha$ is set such that even at the time of pinching the soft object by the window glass 11 of the power window system 1, the rotational speed difference $\Delta\omega$, which is caused by the pinching of the soft object, exceeds the change determining threshold value $\alpha$.

In the power window system 1, once the start of the pinching is detected, i.e., sensed in the above described manner, it is then determined whether a cumulative value of every computed rotational speed difference $\Delta\omega$ (i.e., the total amount of change in the rotational speed $\omega$) since the time of sensing the start of the pinching exceeds a pinching determining threshold value $\beta$ (FIG. 3C). When the total amount of change in the rotational speed $\omega$ exceeds the pinching determining threshold value $\beta$, the pinching is detected (determined or confirmed). FIG. 3C shows a change in the cumulative value ($\Sigma\Delta\omega$) of the rotational speed differences $\Delta\omega$. When the cumulative value exceeds the pinching determining threshold value $\beta$, the controller 31 determines (confirms) that the pinching has occurred.

As discussed above, in the power window system 1 of the present embodiment, the two threshold values $\alpha$, $\beta$ are set. The threshold value $\alpha$ is set for the rotational speed difference $\Delta\omega$, and the threshold value $\beta$ is set for the total amount of change in the rotational speed $\omega$ (the total value of the rotational speed differences $\Delta\omega$). Therefore, the determination subjects of these threshold values $\alpha$, $\beta$ differ from one another.

In the power window system 1 of the present embodiment, the pinching is determined, i.e., confirmed based on the total amount of change in the rotational speed $\omega$ since the time of that the rotational speed difference $\Delta\omega$ exceeds the change determining threshold value $\alpha$ rather than based on the elapsed time period or the number of pulse signals since the time of that the rotational speed difference $\Delta\omega$ exceeds the change determining threshold value $\alpha$.

Therefore, in the power window system 1 of the present embodiment, a pinching load, which is applied to the pinched object, is not excessively increased, so that the pinched object is not damaged while the pinching is effectively determined, i.e., confirmed.

Furthermore, in the power window system 1 of the present embodiment, even when the soft object is pinched, the rotational speed difference $\Delta\omega$ exceeds the change determining threshold value $\alpha$ in a relatively early stage of the pinching. Thus, the pinching is effectively determined, i.e., confirmed at the time of that the total amount of change in the rotational speed difference $\Delta\omega$ since the time of exceeding the change determining threshold value $\alpha$ exceeds the pinching determining threshold value $\beta$. In this case, the pinched object is soft, so that the rotational speed difference $\Delta\omega$ does not become a small value (a large value at the time of seeing it as an absolute value). However, once the change determining threshold value $\alpha$ is exceeded, the cumulation of the rotational speed differences $\Delta\omega$ is started. Therefore, the pinching can be reliably determined, i.e., confirmed at the time of that the cumulative value of the rotational speed differences $\Delta\omega$ (i.e., the total amount of change in the rotational speed difference $\Delta\omega$) exceeds the pinching determining threshold value $\beta$.

Furthermore, similar to the case of pinching the soft object, even in a case of pinching an object of an intermediate hardness (a hardness between the hard object and the soft object), the rotational speed difference $\Delta\omega$ exceeds the change determining threshold value $\alpha$ in an early stage of the pinching to cause initiation of cumulation of the rotational speed differences $\Delta\omega$. Thus, the pinching can be reliably determined at the time of that the total amount of change in the rotational speed difference Δω exceeds the pinching determining threshold value β.

As described above, in the power window system 1 of the present embodiment, the pinching can be reliably determined at the low load regardless of the hardness of the pinched object.

Furthermore, at the time of moving the window glass 11, the rotational speed of the motor 23 would be influenced by a change in a slide resistance or by an external factor even when the object is not pinched by the window glass 11. Even in the case where the rotational speed difference Δω exceeds the change determining threshold value α due to the above influence, the pinching is not determined, i.e., not confirmed as long as the cumulative value of the rotational speed differences Δω does not exceed the pinching determining threshold value β. Thus, even in the case where the change determining threshold value α is set to the value used in the case of detecting the pinching of the soft object, an erroneous determination is less likely to occur, and the pinching of the object can be reliably detected in an earlier stage of the pinching.

Next, the pinching determination process of the controller 31 of the present embodiment will be described with reference to FIG. 4.

The controller 31 of the present embodiment renews the rotational speed data of the motor 23 based on the pulse signal received from the rotation sensing device 27 (step S1). Specifically, the controller 31 senses the pulse edges by processing the pulse signal received from the rotation sensing device 27. Every time that the pulse edge is sensed, a pulse width (a time interval) T between the currently sensed pulse edge and the previously sensed pulse edge is computed and is stored in the memory (e.g., the RAM 31c) one after another.

In the present embodiment, the pulse width T is renewed every time the new pulse edge is sensed, so that the latest four pulse widths T(o) to T(3) are stored in the memory. Specifically, when the pulse edge is sensed, a new pulse width T(0) is computed, and the previously stored pulse widths T(0) to T(2) are shifted and are now stored as the pulse widths T(1) to T(3) in the memory, and the previous pulse width T(3) is erased from the memory.

Then, the controller 31 computes the rotational speed ω based on an inverse of a total value (a pulse period P) of the pulse widths T of n consecutive pulse edges (i.e., the number of the consecutive pulses is n). This rotational speed ω is a value that is proportional to the actual rotational speed.

In the present embodiment, the rotational speed, i.e., the average rotational speed ω(0) is computed based on the pulse widths T(0) to T(3) of the latest four pulse edges. Then, when the next pulse edge is sensed, the rotational speed ω(0) is renewed by the newly computed pulse widths T(0) to T(3). At this time, the previous rotational speed ω(0) is stored in the memory as the rotational speed ω(1). Therefore, the controller 31 always stores eight latest rotational speeds ω(0) to ω(7), which are renewed every time a new pulse edge is sensed (every predetermined moving amount or every predetermined rotational angle). As discussed above, the rotational speed ω is computed based on the multiple pulse widths T, so that the variation in the sensor Duty of each received pulse signal output can be alleviated, and the rotational speed, on which the erroneous change is alleviated, can be computed.

Next, the controller 31 computes the rotational speed difference (the rotational speed signal change rate) Δω based on this rotational speed, i.e., the average rotational speed ω (step S2). Specifically, the rotational speeds ω(0) to ω(3) are used as current block data, and the rotational speeds ω(4) to ω(7) are used as previous block data. Furthermore, a difference between a sum of the current block data and a sum of the previous block data is obtained and is stored in the memory. Specifically, the rotational speed difference Δω is computed by subtracting the sum of the rotational speeds ω(0) to ω(3) from the sum of the rotational speeds ω(4) to ω(7) and is renewed every time the pulse edge is sensed (every predetermined displacement amount or every predetermined rotational angle). Alternatively, the rotational speed difference Δω may be computed by subtracting an average of the four rotational speeds ω(0) to ω(3) from an average of the four rotational speeds ω(4) to ω(7). Here, the average of the four rotational speeds ω(0) to ω(3) may be obtained by dividing the sum of the rotational speeds ω(0) to ω(3) by the number of data (four in the present instance). Also, the average of the rotational speeds ω(4) to ω(7) may be obtained in the same way. Through computation of the rotational speed difference Δω based on the multiple rotational speeds ω, it is possible to alleviate the phase difference between the rotational speeds ω.

Then, the controller 31 adds the computed rotational speed difference Δω to the previously cumulated value of the rotational speed differences Δω, which has been cumulated since predetermined timing, i.e., the time, at which the window glass 11 departs from a predetermined reference position (step S3). Every time the rotational speed difference Δω is computed, the computed rotational speed difference Δω is cumulated, so that the difference in the rotational speed ω is computed with respect to the reference position.

Next, it is determined whether the computed rotational speed difference Δψ exceeds a disturbance determining threshold value γ on a positive side (step S4). For example, when a wheel of the vehicle hits a curb or when the window glass 11 is raised, such a disturbance may cause application of a shock to the window glass 11, so that the rotational speed of the motor 23 may be influenced by it. In the present embodiment, the above described process limits erroneous detection of the pinching caused by such a disturbance.

Figure 5:
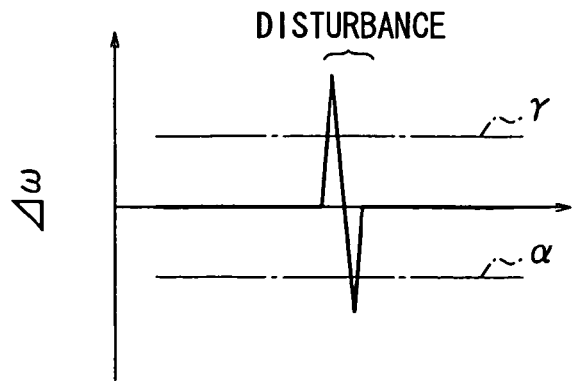
FIG. 5 is a diagram for describing a rotational speed difference at the time of occurrence of disturbance.

As shown in FIG. 5, when the disturbance is applied, the rotational speed difference Δω may be changed significantly on the positive side or the negative side. The significant change in the rotational speed difference Δω on the positive side indicates that the rotation of the motor 23 is accelerated in the closing direction (the upward direction) of the window glass 11. In contrast, the significant change in the rotational speed difference Δω on the negative side indicates that the rotation of the motor 23 is decelerated in the closing direction (the upward direction) of the window glass 11. This significant change in the rotational speed difference Δω on the negative side caused by the disturbance mimics the change in the rotational speed difference Δω at the time of the pinching. Here, the disturbance determining threshold value γ is a value that is set on the positive side. When the rotational speed difference Δω exceeds the disturbance determining threshold value γ on the positive side, the controller 31 of the present embodiment determines that the disturbance has occurred.

When it is determined that the disturbance has occurred (YES at step S4), the controller 31 increases the pinching determining threshold value β on the negative side at step S7 and moves to step S8. In this way, even when the rotational speed difference Δω changes significantly on the negative side due to the disturbance, and therefore the start of the pinching is erroneously detected, the cumulative value of the rotational speed differences Δω does not exceeds the increased pinching determining threshold value β. Thus, it is possible to limit erroneous determination of the occurrence of the pinching. In the present embodiment, the disturbance determining threshold value $\gamma$ is set independently of the change determining threshold value $\alpha$. Alternatively, for example, the disturbance determining threshold value $\gamma$ may be set to an inverse of the change determining threshold value $\alpha$, i.e., a value, which has an absolute value that is the same as that of the change determining threshold value $\alpha$ but with the opposite sign (+) that is opposite to the sign (−) of the change determining threshold value $\alpha$.

When it is determined that the disturbance has not occurred at step S4 (NO at step S4), the controller 31 performs a pinching start determination process for determining the start of the pinching (step S5). Specifically, when the rotational speed difference $\Delta\omega$ exceeds the change determining threshold value $\alpha$ on the negative side, it is determined that the pinching has started. In contrast, when the rotational speed difference $\Delta\omega$ does not exceed the change determining threshold value $\alpha$ on the negative side, it is determined that pinching has not started.

When it is determined that the pinching has started at step S5 (YES at step S5), the controller 31 moves to step S8. In contrast, when it is determined that the pinching has not started at step S5 (NO at step S5), each of the cumulative value of the rotational speed differences $\Delta\omega$ and the pinching determining threshold value $\beta$ is set to its initial value at step S6. Specifically, the cumulative value of the rotational speed differences $\Delta\omega$, which is computed at step S3, is set as an initial amount of change S0 of the rotational speed $\omega$, and the pinching determining threshold value $\beta$ is returned to the normal value, which has not been increased. As discussed above, when it is determined that the period of the disturbance ends, the pinching determining threshold value $\beta$ is returned to the normal value, and the normal process is resumed.

Then, at step S8, the computation process for computing the total amount of change S in the rotational speed $\omega$ is performed. Specifically, the controller 31 subtracts the cumulative value of the rotational speed differences $\Delta\omega$, which is computed at step S3, from the initial amount of change S0 in the rotational speed $\omega$ (the cumulative value of the rotational speed differences $\Delta\omega$), which is set at step S6 right before the determination of the start of the pinching. Thus, the amount of change S in the rotational speed $\omega$ since the start of the pinching (the cumulative value of the rotational speed differences $\Delta\omega$) is computed. In this way, the change in the rotational speed caused by the pinching (i.e., the change corresponding to the pinching load) can be reliably computed.

In the present embodiment, the difference in the amount of change from the reference value is computed to compute the amount of change in the rotational speed $\omega$ since the start of the pinching. However, this may be modified as follows. That is, when the start of the pinching is not detected, the cumulative value of the rotational speed difference $\Delta\omega$ is initialized. In contrast, when the start of the pinching is detected, the initialization of the cumulative value of the rotational speed difference $\Delta\omega$ is not performed, and the rotational speed differences $\Delta\omega$ may be cumulated only for those after the detection of the start of the pinching to compute the amount of change in the rotational speed $\omega$.

Next, the controller 31 determines whether the amount of change S in the rotational speed $\omega$, which is computed at step S8, exceeds the pinching determining threshold value $\beta$ at step S9.

When it is determined that the amount of change S in the rotational speed $\omega$ exceeds the pinching determining threshold value $\beta$ at step S9 (YES at step S9), the controller 31 performs a pinched object releasing process for releasing the pinched object at step S10. Then, the entire operation ends. Specifically, in the pinched object releasing process, the controller 31 reverses the rotation of the motor 23 to lower the window glass 11 by the predetermined amount, thereby releasing the pinched object.

In contrast, when it is determined that the amount of change S in the rotational speed $\omega$ does not exceed the pinching determining threshold value $\beta$ at step S9 (NO at step S9), the entire operation is terminated.

In the present embodiment, each of the change determining threshold value $\alpha$, the pinching determining threshold value $\beta$, the disturbance determining threshold value $\gamma$ is set to the corresponding predetermined value independent of the position of the window glass 11. However, the present invention is not limited to this. For example, these values may be set to vary depending on the position of the window glass 11.

Furthermore, in the present embodiment, the opening and closing member control system of the present invention is applied to the power window system 1 of the door 10 of the vehicle. However, the present invention is not limited to this. For example, the window panel 11 of the door 10 may be replaced with a sunroof window panel of a sunroof opening and closing system of the vehicle. Further alternatively, the opening and closing member control system may be applied to any other appropriate opening and closing system (e.g., a slide door opening and closing system), in which a sliding door (serving as an opening and closing member) is driven to open and close a corresponding door opening.

Additional advantages and modifications will readily occur to those skilled in the art. The invention in its broader terms is therefore not limited to the specific details, representative apparatus, and illustrative examples shown and described.

What is claimed is:

1. An opening and closing member control system comprising:
   a drive means for driving an opening and closing member in an opening direction and a closing direction, respectively, of the opening and closing member;
   a moving speed sensing means for outputting a speed measurement signal, which indicates a moving speed that corresponds to movement of the opening and closing member driven by the drive means; and
   a pinching sensing means for sensing pinching of an object by the opening and closing member based on the speed measurement signal, wherein:
   the pinching sensing means computes an amount of change in the moving speed per unit interval based on the speed measurement signal;
   the pinching sensing means senses start of the pinching of the object by the opening and closing member based on the amount of change in the moving speed per unit interval;
   the pinching sensing means computes a total amount of change in the moving speed since time of sensing the start of the pinching of the object by the opening and closing member; and
   the pinching sensing means confirms the pinching of the object by the opening and closing member when the total amount of change in the moving speed exceeds a pinching determining threshold value.

2. The opening and closing member control system according to claim 1, wherein the pinching sensing means senses the start of the pinching of the object when the amount of change in the moving speed per unit interval exceeds a change determining threshold value.

3. The opening and closing member control system according to claim 1, wherein:
   an amount of change in the moving speed per unit moving distance is computed by the pinching sensing means as the amount of change in the moving speed per unit interval based on the speed measurement signal; and
   a cumulative value of every computed amount of change in the moving speed per unit moving distance since the time of sensing the start of the pinching of the object by the opening and closing member is computed by the pinching sensing means as the total amount of change in the moving speed since the time of sensing the start of the pinching of the object by the opening and closing member.

4. The opening and closing member control system according to claim 1, wherein:
   an amount of change in the moving speed per unit moving distance is computed by the pinching sensing means as the amount of change in the moving speed per unit interval based on the speed measurement signal;
   a pre-start cumulative value of every computed amount of change in the moving speed per unit moving distance from predetermined timing to the time of sensing the start of the pinching of the object by the opening and closing member is subtracted by the pinching sensing means from a current cumulative value of every computed amount of change in the moving speed per unit moving distance from the predetermined timing to current time to obtain a difference between the pre-start cumulative value and the current cumulative value as the total amount of change in the moving speed.

5. The opening and closing member control system according to claim 1, wherein the pinching sensing means increases the pinching determining threshold value on a negative side when the amount of change in the moving speed per unit interval exceeds a disturbance determining threshold value on a positive side.

6. The opening and closing member control system according to claim 5, wherein the pinching sensing means resets the pinching determining threshold value, which has been increased on the negative side, to an initial value when the amount of change in the moving speed per unit interval does not exceeds the change determining threshold value.

7. The opening and closing member control system according to claim 1, wherein:
   the drive means includes a motor;
   the moving speed sensing means outputs a rotational speed signal of the motor, which indicates a rotational speed of the motor, as the speed measurement signal; and
   the pinching sensing means uses an amount of change in the rotational speed of the motor per unit interval, which is computed based on the rotational speed signal of the motor, as the amount of change in the moving speed per unit interval.

8. The opening and closing member control system according to claim 7, wherein the pinching sensing means computes the rotational speed of the motor based on a predetermined number of consecutive pulse signals, each of which is synchronized with rotation of the motor and is outputted per unit rotational angle of the motor from the moving speed sensing means as the rotational speed signal.

9. The opening and closing member control system according to claim 8, wherein the pinching sensing means computes the amount of change in the moving speed per unit interval based on an average rotational speed that is obtained by averaging a predetermined number of consecutive computed rotational speeds, each of which is computed per unit rotational angle of the motor.

10. The opening and closing member control system according to claim 1, further comprising a moving speed storage means for storing the moving speed indicated by the speed measurement signal.

11. The opening and closing member control system according to claim 1, wherein the opening and closing member is a window panel of a vehicle.

* * * * *